United States Patent [19]
Nishida et al.

[11] Patent Number: 4,640,773
[45] Date of Patent: Feb. 3, 1987

[54] MEMBRANE SEPARATION APPARATUS

[75] Inventors: Yuji Nishida; Yoshiyasu Kamiyama; Koichi Okuno, all of Osaka, Japan

[73] Assignee: Nitto Electric Industrial Co., Ltd., Osaka, Japan

[21] Appl. No.: 735,897

[22] Filed: May 20, 1985

[30] Foreign Application Priority Data

May 18, 1984 [JP] Japan ................. 59-101495

[51] Int. Cl.$^4$ ............................................. B01D 13/01
[52] U.S. Cl. .............................. 210/321.1; 210/433.2; 55/158
[58] Field of Search ............... 210/321.1, 323.2, 433.2, 210/446, 456; 55/158; 422/48

[56] References Cited
U.S. PATENT DOCUMENTS

| | | | |
|---|---|---|---|
| 3,710,946 | 1/1973 | Sawyer | 210/321.1 |
| 4,220,725 | 9/1980 | Knazek et al. | 435/285 |
| 4,239,624 | 12/1980 | van Zon | 210/456 X |
| 4,425,234 | 1/1984 | Reitz | 210/321.3 |

Primary Examiner—David Sadowski
Attorney, Agent, or Firm—Sughrue, Mion, Zinn, Macpeack, and Seas

[57] ABSTRACT

A membrane separation apparatus comprising: a cylindrical case provided with an outlet for a membrane permeated fluid; a plurality of tubular or capillary membranes which are inserted into the cylindrical case in a substantially parallel state with each other and in a closely bundled state, the membranes each other and also the bundled membranes and the cylindrical case being bonded and fixed with a casting resin at both end portions thereof; a cap having a nozzle for a feed inlet and a nozzle for a membrane permeated fluid outlet, provided at one end of the cylindrical case; and a cap having a nozzle for a concentrated fluid provided at another end of the cylindrical case, wherein at least one open end of the tubular or capillary membranes is arranged with a slope with respect to the axis of the cylindrical case, and the nozzle for the feed inlet and the nozzle for the membrane permeated fluid are provided on the substantially same axis.

4 Claims, 3 Drawing Figures

FIG. 1 PRIOR ART
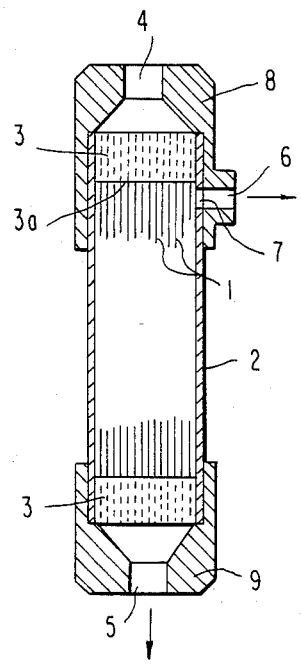
FIG. 2
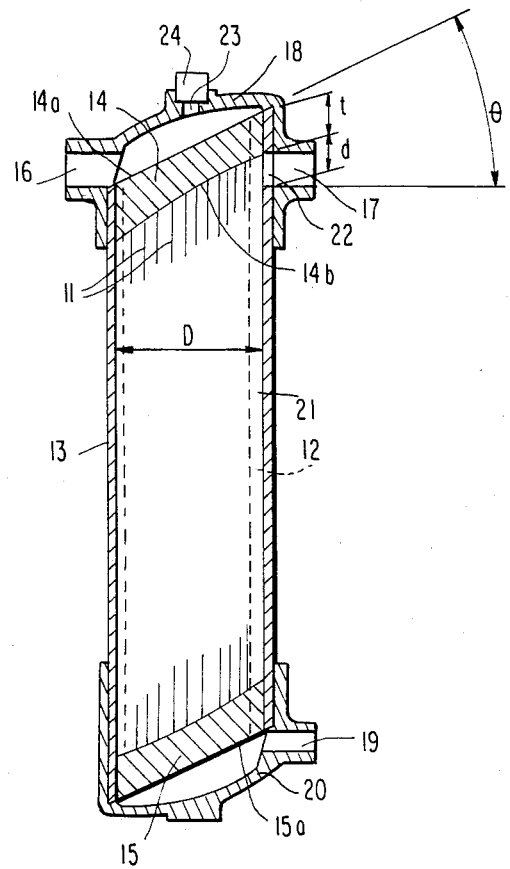
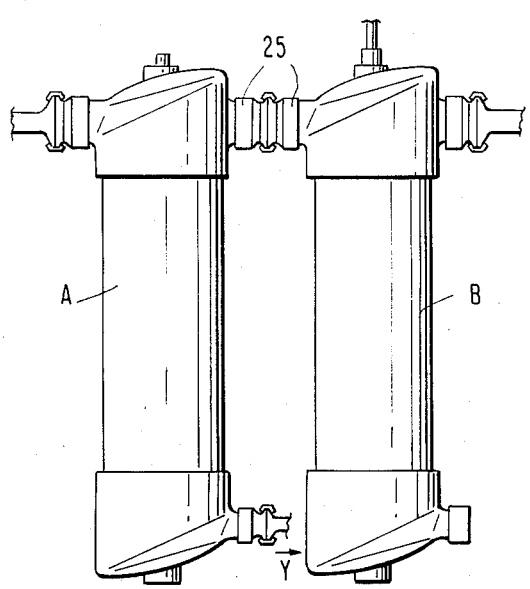
FIG. 3

MEMBRANE SEPARATION APPARATUS

FIELD OF THE INVENTION

This invention relates to a membrane separation apparatus for separation treating various fluids using a tubular or capillary membrane.

BACKGROUND OF THE INVENTION

In the treatment of fluids such as a liquid, a gas, etc., membrane separating apparatuses using tubular or capillary membranes are used for the separation of solvents or solutes from feeds by reverse osmosis, ultrafiltration or microfiltration; the separation of gases; etc.

As the above-described membrane separation apparatus, a membrane separation apparatus is known, in which a plurality of tubular or capillary membranes are inserted into a cylindrical case, the membranes each other and the membranes and the case, at the end portions of the membranes, are sealed and fixed with a casting resin, and the membranes have both open ends. FIG. 1 illustrates one embodiment of the specific structures thereof.

Referring to FIG. 1, a plurality of tubular or capillary membranes 1 are bundled in a parallel state with each other and inserted into a cylindrical case 2 provided with an outlet 7 for a membrane permeated fluid, both end portions of the tubular or capillary membranes are integrally bonded with a casting resin 3 to each other and fixed to the case 2, the membranes 1 have both open ends, a cap 8 having a nozzle 4 for a feed inlet and a nozzle 6 for a membrane permeated fluid outlet is provided at one end of the case 2, and a cap 9 having a nozzle 5 for a concentrated fluid outlet is provided at the other end thereof.

In the case that a feed is separation treated with such a membrane separation apparatus, the apparatus is generally used in longitudinal arrangement mode such that the axis of the case 2 lies in vertical direction, taking into consideration the arrangement area, the exchange operation efficiency or the like. The feed is fed from the inlet nozzle 4, the concentrated fluid is flown out of the outlet nozzle 5, and the membrane permeated fluid obtained is taken out from the outlet nozzle 6 for the permeated fluid.

The conventional membrane separation apparatus described above has following problems:

(i) The inlet and the outlet of the feed are positioned at both ends of the case, so that the pipe arrangement becomes complicated in longitudinal and vertical directions when arranging the apparatus in longitudinal arrangement mode.

(ii) The inner and outer faces of the casting resin 3 are formed perpendicular to the axis of the case 2, so that foams or membrane permeated fluids retain in the neighborhood of the inner face 3a of the casting resin 3 and microorganisms or the like grow at this retention portion to contaminate the membrane permeated fluid.

(iii) Due to the contamination of the membrane permeated fluid by the generation of foams or the retention of the membrane permeated fluids, performance of the membrane separation apparatus is lowered.

(iv) The outlet 6 for the permeated liquid is provided close to the outer periphery of the tubular or capillary membranes 1, so that the flow of the membrane permeated fluid from the tubular or capillary membranes 1 becomes maximum in the neighborhood of the outlet 6 for the membrane permeated liquid and the tubular or capillary membranes 1 will be damaged around this portion.

SUMMARY OF THE INVENTION

Accordingly, this invention is intended to overcome the disadvantages of the prior art and achieve the advantages that the pipe arrangement is simple and any fluid retention portion is not present in the cylindrical case, so that separation performance is excellent and safety is very high.

One object of this invention is to provide a membrane separation apparatus comprising a cylindrical case provided with an outlet for a membrane permeated fluid, a plurality of tubular or capillary membranes which are inserted into the cylindrical case in a substantially parallel and closely bundled state with each other, the membranes each other and also the bundled membranes and the cylindrical case being bonded and fixed with a casting resin at both end portions thereof, a cap having a nozzle for a feed inlet and a nozzle for membrane permeated fluid outlet provided at one end of the cylindrical case, and a cap having a nozzle for a concentrated fluid outlet provided at other end of the cylindrical case, wherein at least one open end of the tubular or capillary membranes is arranged with a slope to the axis of the cylindrical case, and the nozzle for the feed inlet and the nozzle for the membrane permeated fluid outlet are provided on the substantially same axis.

Another object of this invention is to provide the membrane separation apparatus, wherein the inner face of the casting resin positioned close to the outlet of the membrane permeated fluid is substantially in the same level to the circumferential edge of the opening of the outlet for the membrane permeated fluid in the neighborhood of the open face thereof and is gradually curved or sloped down from the circumferential edge of the openings to the inside direction of the cylindrical case.

Further object of this invention is to provide the membrane separation apparatus, wherein the bundled membranes fixed with the casting resins are covered with a protecting member and the protecting member is arranged so as to make the axis thereof eccentric in the direction opposite to the outlet side of the membrane permeated fluid in the cylindrical case.

BRIEF DESCRIPTION OF THE DRAWINGS

FIG. 1 is a vertical cross-sectional view showing the conventional membrane separation apparatus;

FIG. 2 is a vertical cross-sectional view showing the membrane separation apparatus according to this invention; and FIG. 3 is a view showing an example using the membrane separation apparatuses of this invention.

DETAILED DESCRIPTION OF THE INVENTION

The tubular membrane which can be used in this invention has an inner diameter of from about 4 to 25 mm, and the capillary membrane which can be used in this invention has an inner diameter of about 4 mm or less.

This invention will be now explained in detail by reference to FIG. 2.

In FIG. 2, a plurality of tubular or capillary membranes 11 are bundled in parallel with each other and inserted into a cylindrical case 13 having an outlet 22 for the membrane permeated fluid in the state such that the outer periphery of the bundled membranes is covered with a protecting member 12 such as a cylindrical net-like material or a porous tube, which does not disturb the flow of the membrane permeated fluid.

In both ends of the tubular or capillary membranes 11, the membranes 11 to each other and the protecting member 12 and the peripheral inner face of the case 13 are fixed with casting resins 14, 15. A head cap 18 having a nozzle 16 for a feed inlet and a nozzle 17 for a permeated fluid outlet, and an end cap 20 having a nozzle 19 for a concentrated fluid are fixed by means of adhesion or the like on one end and on the other end of the case 13, respectively.

The nozzle 16 for the feed inlet and the nozzle 17 for the membrane permeated fluid outlet are positioned facing each other with respect to the axis of the cylindrical case and substantially on the same level. The inner face of the head cap 18 has a curvature so as not to retain air therein and is provided with an air vent 23 around the center thereof. The vent is generally closed with a plug 24 during operation.

The casting resin 14 positioned at the side of the above-described head cap 18 is formed on a sloped face that the upper face having the open ends of the tubular or capillary membranes 11 is declined toward the nozzle 16 for the feed inlet, and the lowermost part of the sloped face 14a coincides with the lower edge of the nozzle 16 for the feed inlet.

The degree $\theta$ of the slope of the sloped face 14a and the inner face 14b varies depending on the inner diameter D of the case 13, the thickness t of the casting resin 14 and the opening diameter d of the membrane permeated fluid outlet 22, and can be appropriately determined by the following equation:

$$\tan \theta = (t+d)/D \quad (1)$$

The degree $\theta$ is generally from about 5° to 70°, preferably from 15° to 45°.

The ends of each tubular or capillary membrane 11 are open and are arranged in the sloped state along the outer sloped faces 14a, 15a of the casting resins 14, 15.

The inner face 14b of the casting resin 14 is a curvature or a sloped face which is substantially parallel to the sloped face 14 and declines toward the feed inlet 16, and the uppermost part of the sloped face 14a is substantially at the same level to the upper edge of the nozzle 17 for the membrane permeated fluid outlet.

The casting resin 15 positioned in the side of the end cap 20 is declined so as to be parallel to the casting resin 14 in the side of the head cap 18 as shown in FIG. 2, but the end cap 20 can be provided so as to be perpendicular to the axis of the case 13.

The bundled tubular or capillary membranes 11 and the protecting member 12 which covers the membranes are arranged so as to make the axis thereof eccentric in the direction opposite to the side of the nozzle 17 for the membrane permeated fluid outlet. Such a structure makes it possible to flow smoothly the membrane permeated fluid therethrough to the membrane permeated fluid outlet 22 and also prevent the deformation of the tubular or capillary membranes 11 toward the membrane permeated fluid outlet 22.

The separation apparatus of this invention has the constitution as described above. The feed introduced from the nozzle 16 for the feed inlet flows through the tubular or capillary membranes 11 and the membrane permeated fluid flows out from a space 21 formed between the case 13 and the protecting member 12 to the nozzle 17 for the membrane permeated fluid.

The concentrated fluid is taken out from the outlet nozzle 19, but it is also possible to recover the whole amount of the feed if the nozzle 19 is closed with a cap.

The bundled tubular or capillary membranes 11 and the protecting member 12 have the eccentric axis in the direction opposite to the side of the membrane permeated fluid outlet 22 in the case 13, and the space 21 is most wide at the side of the membrane permeated fluid outlet 22, so that the membrane permeated fluid is collected at the large width part of the space 21 uniformly in a relatively low flow rate and flows out from the membrane permeated fluid outlet 22, preventing the occurrence of the damage of the tubular or capillary membranes 11 due to the flow rate of the membrane permeated fluid.

The membrane separation apparatus of the invention is generally used alone, but depending on the purpose of use, the first membrane separation apparatus and the second membrane separation apparatus can be used in a direct arrangement as shown in FIG. 3. In this case, it becomes possible to make a rapid counteraction on the happening of troubles by providing the second membrane separation apparatus with the function as the preliminary or safety apparatus or using the second apparatus as a monitor or control of the first membrane separation apparatus.

The membrane separation apparatus of this invention has the structure such that the feed inlet and the membrane permeated fluid outlet are arranged substantially on the same axis as described above, so that the direct pipe arrangement thereof can be simply effected in a small space using only a fitting 25.

As described above, the apparatus according to this invention has the above-described structure so that it has the following effects:

(a) The feed inlet and the membrane permeated fluid outlet are provided substantially on the same axis, so that pipe arrangement can also be made on the same axis, and the apparatus can be provided in a in-line mode in relation to the pipe arrangement, resulting in facilitating the pipe arrangement.

(b) The end openings of the bundled tubular or capillary membranes are inclined and the casting resins are formed in a sloped state, so that the foams or the membrane permeated fluid do not retain in the cylindrical case and flow into the membrane permeated fluid outlet. Thus, contamination of the membrane permeated fluid does not cause and the performance of the apparatus is greatly improved. Therefore, the apparatus can be appropriately used for the production of pure water, super-pure water, sterillized water and the like or for the application to the art of foods.

(c) The bundled tubular or capillary membranes have the eccentric axis in the direction opposite to the side of the membrane permeated fluid outlet, so that a sufficient space can be obtained between the bundled tubular or capillary membranes and the membrane permeated fluid outlet. Therefore, damage of the tubular or capillary membranes does not cause by the flow rate of the membrane permeated fluid, and the safety can be improved.

While the invention has been described in detail and with reference to specific embodiments thereof, it will be apparent to one skilled in the art that various changes and modifications can be made therein without departing from the spirit and scope thereof.

What is claimed is:

1. A membrane separation apparatus comprising: a cylindrical case provided with an outlet for a membrane permeated fluid; a plurality of tubular or capillary membranes which are inserted into the cylindrical case in a substantially parallel state with each other and in a closely bundled state, the membranes themselves and also the bundled membranes and the cylindrical case being bonded and fixed with casting resin at both end portions of said membranes and said cylindrical case to define two casting resin outer faces including open ends of said membranes; a cap having a nozzle for a feed inlet communicating directly with a first of said outer faces and a nozzle for a membrane permeated fluid outlet communicating with the interior of said cylindrical case between said casting resins and aligned with said outlet for a membrane permeated fluid provided in said cylindrical case, provided at one end of the cylindrical case; and a cap having a nozzle for a concentrated fluid communicating directly with a second of said outer faces, provided at another end of the cylindrical case, wherein at least one outer face is arranged with a slope with respect to a vertical axis of the cylindrical case, and the nozzle for the feed inlet and the nozzle for the membrane permeated fluid are provided on substantially the same axis which is perpendicular to the vertical axis of the cylindrical case.

2. A membrane separation apparatus as in claim 1, wherein an inner face of the casting resin positioned adjacent the nozzle for a membrane permeated fluid outlet is substantially at the same level as a circumferential edge of an opening of the nozzle for a membrane permeated fluid outlet in an area of the opening of the nozzle for the membrane permeated fluid outlet and is gradually curved or sloped down from the circumferential edge of the opening toward the inside of the cylindrical case.

3. A membrane separation apparatus as in claim 1, wherein the bundled tubular or capillary membranes fixed with the casting resins are covered with a protecting member and the protecting member is arranged so as to make the axis of said bundled membranes eccentric in the direction opposite to a side of the cylindrical case having the outlet for a membrane permeated fluid.

4. A membrane separation apparatus as in claim 1, wherein the outer face adjacent the nozzle for a feed inlet is arranged with a slope with respect to the vertical axis of the cylindrical case.

* * * * *